(12) United States Patent
Attia

(10) Patent No.: US 10,611,412 B1
(45) Date of Patent: Apr. 7, 2020

(54) INTERACTIVE SECURE CABIN

(71) Applicant: Nacereddine Attia, Los Angeles, CA (US)

(72) Inventor: Nacereddine Attia, Los Angeles, CA (US)

(*) Notice: Subject to any disclaimer, the term of this patent is extended or adjusted under 35 U.S.C. 154(b) by 0 days.

(21) Appl. No.: 16/162,519

(22) Filed: Oct. 17, 2018

Related U.S. Application Data

(60) Provisional application No. 62/573,821, filed on Oct. 18, 2017.

(51) Int. Cl.
| | |
|---|---|
| *B62D 24/00* | (2006.01) |
| *B60R 21/00* | (2006.01) |
| *B62D 21/15* | (2006.01) |
| *B60R 21/0134* | (2006.01) |
| *B60R 21/02* | (2006.01) |
| *B60R 21/01* | (2006.01) |

(52) U.S. Cl.
CPC ............ *B62D 24/00* (2013.01); *B62D 21/15* (2013.01); *B60R 21/0134* (2013.01); *B60R 2021/0004* (2013.01); *B60R 2021/01013* (2013.01); *B60R 2021/01252* (2013.01); *B60R 2021/0273* (2013.01)

(58) Field of Classification Search
CPC ......... B62D 24/00; B60R 21/02; B60R 21/15; B60R 2021/0273
USPC ....................................................... 296/35.2
See application file for complete search history.

(56) References Cited

U.S. PATENT DOCUMENTS

| | | | | |
|---|---|---|---|---|
| 2,446,609 A | * | 8/1948 | Reed ..................... | B64C 25/001 244/121 |
| 3,162,479 A | * | 12/1964 | Hewitt .................. | B62D 39/00 296/35.2 |
| 3,423,124 A | * | 1/1969 | Hewitt ............... | B60N 2/42781 296/68.1 |
| 3,479,080 A | * | 11/1969 | Hilfiker .................... | B62D 1/19 296/35.2 |
| 3,508,783 A | * | 4/1970 | Schlanger .............. | B62D 39/00 296/35.2 |
| 3,589,466 A | * | 6/1971 | Dudley ................ | B60N 2/4221 180/232 |
| 3,695,629 A | * | 10/1972 | Schlanger ............... | B60R 19/02 280/730.1 |

(Continued)

FOREIGN PATENT DOCUMENTS

DE          19817992 A1 * 12/1999 ............. B60R 21/02

*Primary Examiner* — Dennis H Pedder
(74) *Attorney, Agent, or Firm* — Christopher P. Maiorana, PC

(57) ABSTRACT

An apparatus comprising a chassis, a compartment and a safety system. The chassis may comprise a chassis base, curved rear chassis pillars and inclined front chassis pillars. The compartment may comprise a compartment base and curved rear compartment pillars. The safety system may be configured to (a) receive a signal and (b) activate a safety measure in response to the signal. The chassis supports the compartment. The compartment provides seating for occupants of a vehicle. The signal indicates an amount of force. The safety measure comprises (a) lifting a front of the compartment from the chassis, (b) rotating the curved rear compartment pillars along the curved rear chassis pillars and (c) absorbing the force with the chassis base while the compartment is lifted.

19 Claims, 12 Drawing Sheets

(56) References Cited

U.S. PATENT DOCUMENTS

| | | | | |
|---|---|---|---|---|
| 3,831,998 | A * | 8/1974 | Hewitt | B62D 1/19 |
| | | | | 296/35.2 |
| 3,837,422 | A * | 9/1974 | Schlanger | B62D 39/00 |
| | | | | 280/734 |
| 4,826,209 | A * | 5/1989 | Farris | B62D 39/00 |
| | | | | 180/274 |
| 5,738,378 | A * | 4/1998 | Yazejian | B62D 39/00 |
| | | | | 180/232 |
| 6,464,275 | B2 * | 10/2002 | Laurent | B62D 39/00 |
| | | | | 180/274 |

* cited by examiner

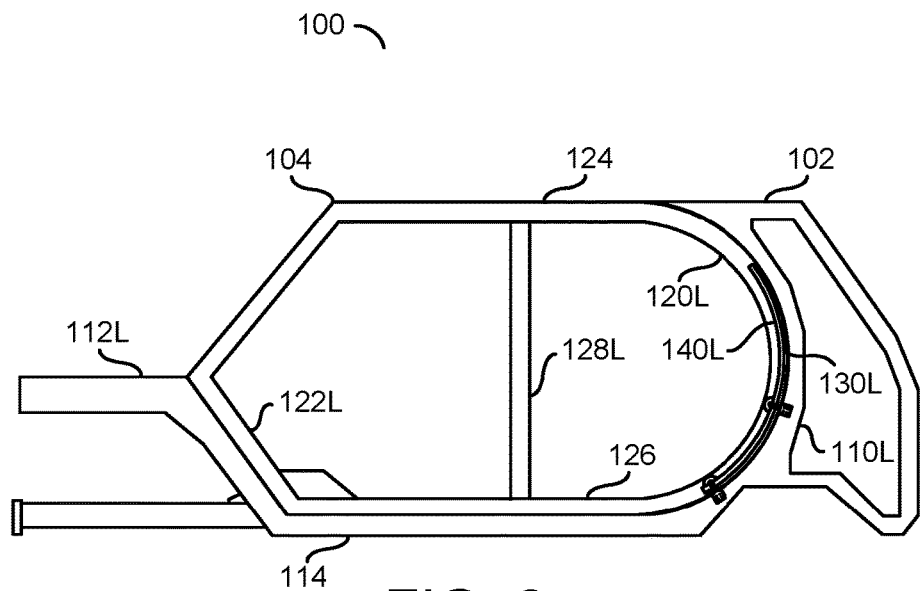
FIG. 6
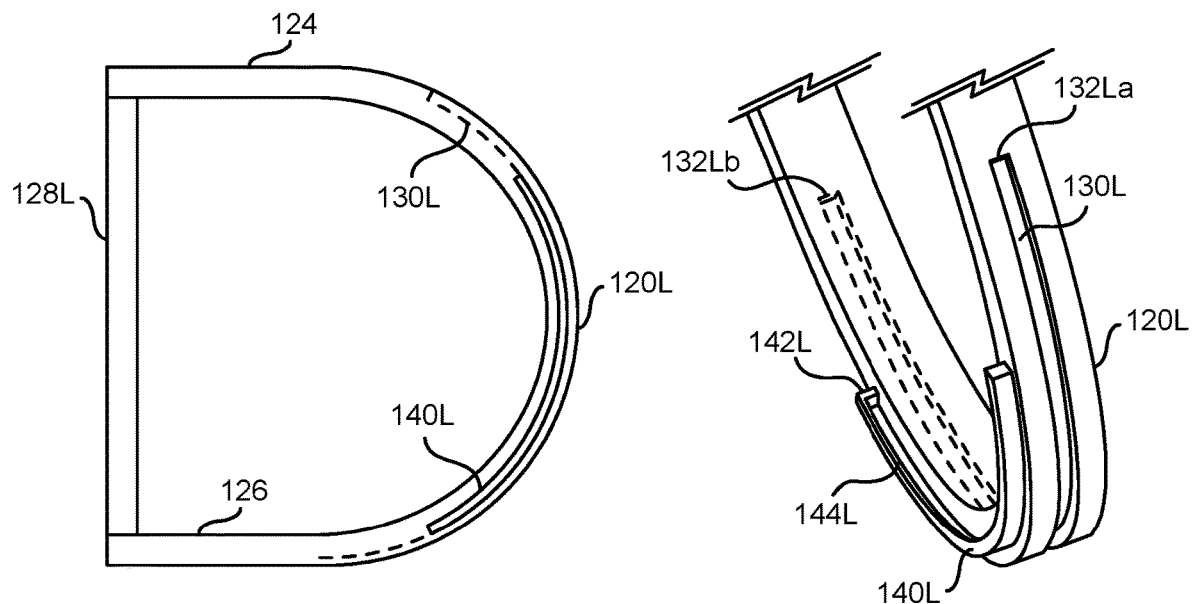
FIG. 7
FIG. 8

INTERACTIVE SECURE CABIN

This application relates to U.S. Provisional Application No. 62/573,821, filed Oct. 18, 2017, which is hereby incorporated by reference in its entirety.

FIELD OF THE INVENTION

The present invention is related to the safety of car passengers, in case of frontal or back collisions. The present invention provides a new method of car chassis design and structure with a mechanical system designed to contribute efficiently to the safety of passengers.

BACKGROUND

When a car is involved in a front collision, even if it is equipped with modern and advanced safety systems, the force of the collision still causes passengers to go forward and hit the dashboard, windshield and seats inside the car.

Although many think of a car crash as only a single collision, there are actually at least three collisions in one crash:

1. Collision one is when the car hits an object.
2. Collision two is when the occupants hit inside portions of the car such as the steering wheel, dashboard, windshield, seats, etc.
3. Collision three is when the internal organs inside the human body keep going forward and crash into the interior structure inside the body. For example the heart and the lungs crash inside the rib cage, the brain crashes inside the skull, etc.

In a crash, passengers stop too quickly because the front end of the car is too short to provide sufficient collapsing or absorption of all the energy created from the crash (e.g., Ke).

BRIEF SUMMARY

The present invention seeks to provide a solution for the multiple collision problem and the problem of passengers stopping too quickly. The present invention may ensure full safety of the passengers during front or rear collisions by providing a movable compartment.

The movement of the compartment gives more distance to absorb the energy and decelerate the force of the impact slowly over time.

The movement of the compartment keeps the occupants on their seats rather than allowing them to be forced forward, so that the occupants may not hit inside portions of the car (e.g., the steering wheel, dashboard, windshield, seats, etc.). Keeping the occupants in the seating of the vehicle may ensure a full protection of the internal human organs from internal damages, because the occupants do not move from their seats.

DESCRIPTION OF THE DRAWINGS

FIG. 6 is a diagram illustrating a car frame consisting of two parts;

FIG. 7 is a diagram illustrating a view of the rear pillar of the compartment having a groove in the middle, and a slider on the side;

FIG. 8 is a diagram illustrating an alternate view of the rear pillar of the compartment having a groove in the middle, and a slider on the side;

DETAILED DESCRIPTION

Figure 1:
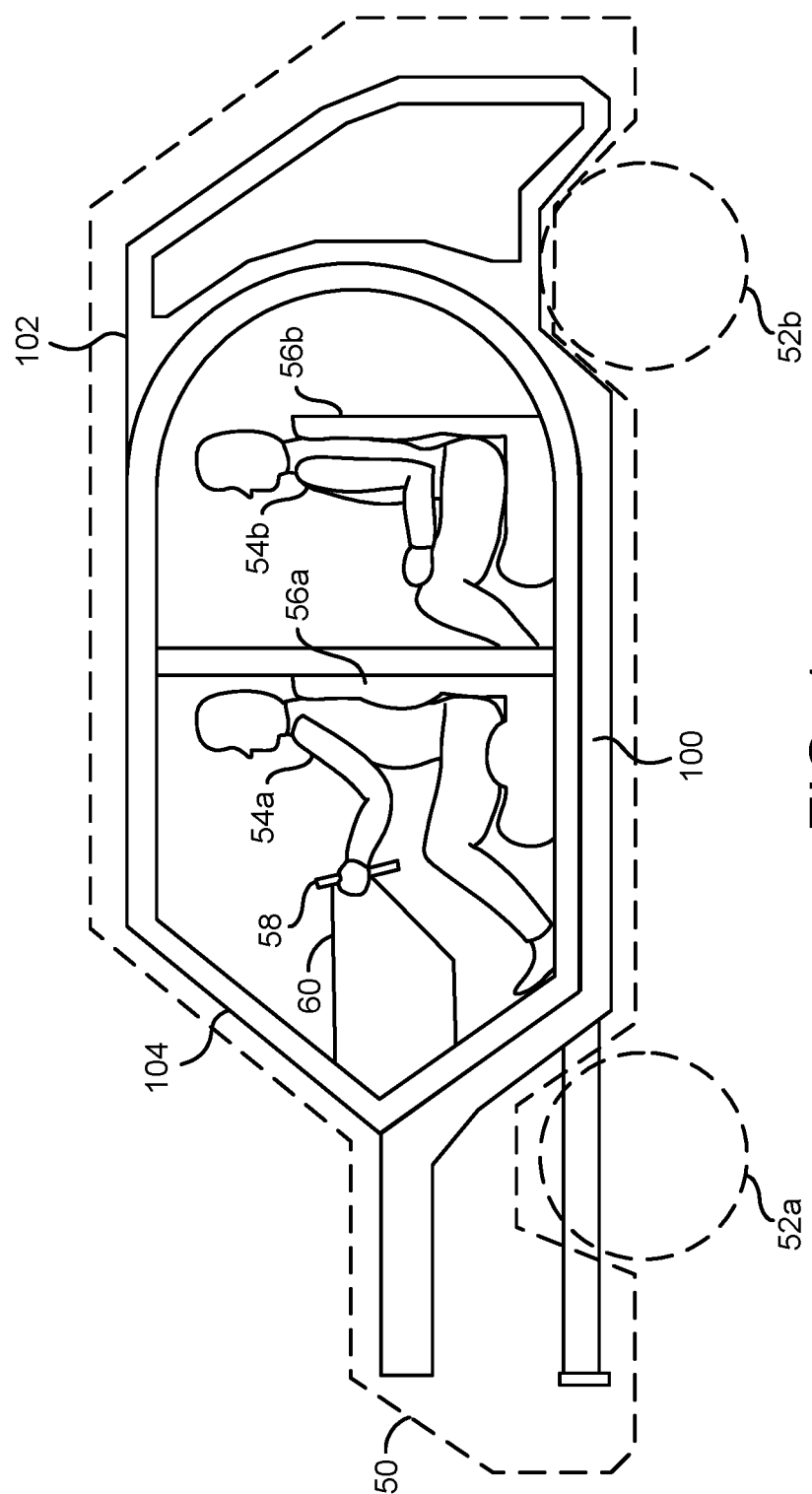
FIG. 1 is a diagram illustrating an example embodiment of the invention.

Referring to FIG. 1, a diagram illustrating an apparatus 100 in accordance with an embodiment of the present invention is shown. The apparatus 100 is shown in the context of a vehicle 50. A number of wheels 52*a*-52*b* are shown supporting the vehicle 50 and/or the apparatus 100. In one example, the vehicle 50 may be a car. In another example, the vehicle 50 may be a van (e.g., a minivan, a utility van, etc.). In yet another example, the vehicle 50 may be a truck and/or a portion of a truck (e.g., a cabin portion of a semi-truck). The type of the vehicle 50 utilizing the apparatus 100 may be varied according to the design criteria of a particular implementation.

The apparatus 100 may comprise a chassis 102 and/or a compartment 104. The chassis 102 and/or the compartment 104 are shown within and/or as a component of the vehicle 50. In an example, the chassis 102 and/or the compartment 104 may be configured as a portion of a frame of the vehicle 50. A left side of the vehicle 50, the chassis 102 and/or the compartment 104 is shown. The apparatus 100 may be configured as two parts of the body of the vehicle 50 (e.g., the chassis 102 and the compartment 104).

In the example shown, the compartment 104 is shown resting on the chassis 102. For example, the chassis 102 may provide support for the compartment 104. The compartment 104 may comprise a seating area (e.g., a cabin) of the vehicle 50. A number of occupants 54a-54b are shown within the compartment 104. The occupants 54a-54b are shown seated on respective seats 56a-56b. In an example, the seats 56a-56b may be secured to the compartment 104. The occupant 54a (e.g., a driver) may be operating a steering wheel 58. The steering wheel may be connected to a dashboard 60. A number and/or type of components of the vehicle 50 implemented within the compartment 104 and/or a number of occupants 52a-52b within the compartment 104 may be varied according to the design criteria of a particular implementation.

The compartment 104 may be moveable. Implementing the compartment 104 as moveable may reduce an amount of injury sustained by the occupants 54a-54b when the vehicle 50 is in a collision. Moving the compartment 104 with respect to the chassis 102 may provide more distance for absorbing energy and/or decelerate force slowly over time. Moving the compartment 104 may enable the occupants 54a-54b to be kept on the seats 56a-56b. In an example, when the compartment 104 moves, the occupant driver 54a may not hit the steering wheel 58 and/or the dashboard 60.

Figure 2:
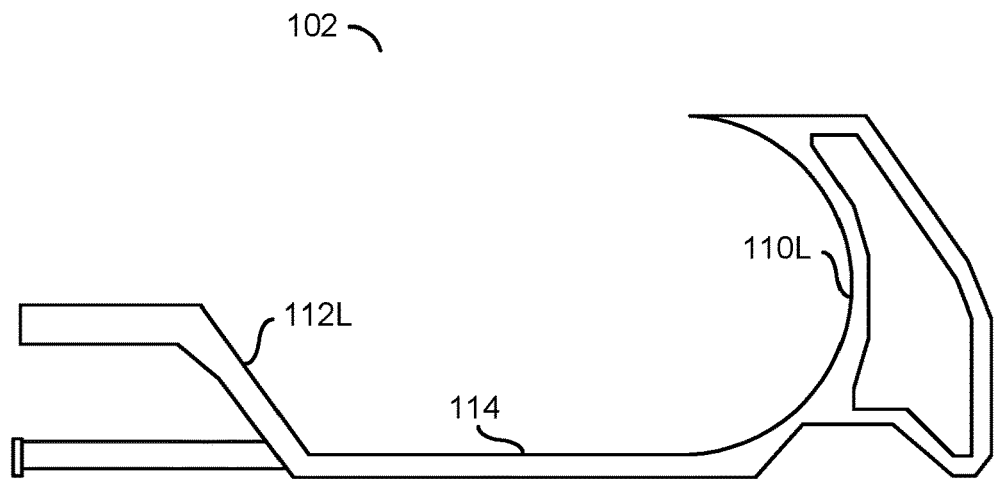
FIG. 2 is a diagram illustrating the left side of a chassis having the rear pillar on shape of arc, a front pillar inclined and a base.

Referring to FIG. 2, a diagram illustrating the left side of the chassis 102 is shown. The chassis 102 may have a left rear pillar 110L in the shape of an arc, a left front pillar 112L which is inclined, and a base 114. The left rear pillar 100L, the left front pillar 112L and the base 114 may be configured to provide support for the compartment 104.

The left rear pillar 110L may have an arc shape. The arc shape of the left rear pillar 110L may enable the compartment 104 to rotate along the chassis 102. The left rear pillar 110L may further be configured to prevent the compartment 104 from shifting backwards in a rear collision scenario. The left front pillar 112L may have an inclined shape. The inclined shape of the left front pillar 112L may enable the compartment 104 to rest on the chassis 102 in a neutral state (e.g., in a standard driving position as shown in association with FIG. 1). The inclined shape of the left front pillar 112L may enable the compartment 104 to be lifted from the chassis 102 without obstruction. The inclined shape of the left front pillar 112L may enable the compartment 104 to move forward without colliding with the left front pillar 112L. The base 114 may provide structural support for the vehicle 50 and/or the compartment 104.

Figure 3:
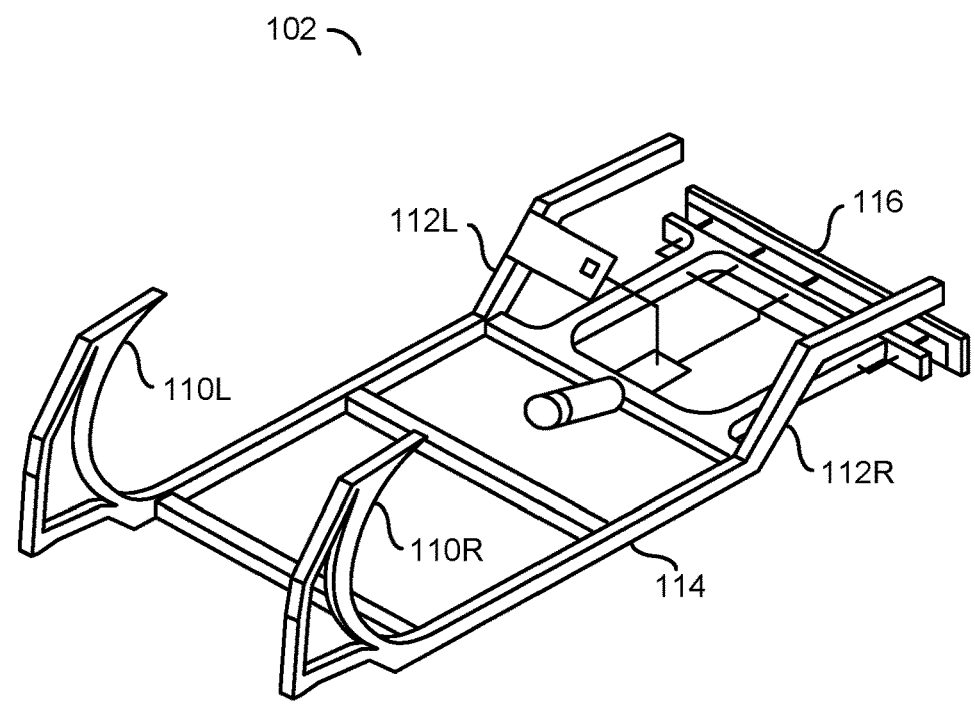
FIG. 3 is a diagram illustrating a 3D view of the whole body of the chassis.

Referring to FIG. 3, a diagram illustrating the 3D view of the whole chassis body 102 is shown. The chassis 102 has a right front pillar 112R and a left front pillar 112L, a right rear pillar 110R and a left rear pillar 110L, and/or a base 114 (e.g., all the area between the front pillars and the rear pillars, the left pillars and the right pillars). Generally, the chassis 102 may have a symmetrical shape. For example, the right rear pillar 110R may have the same arc shape as the left rear pillar 110L and the front right pillar 112R may have a similar implementation as the left front pillar 112L.

The compartment 104 may be configured to rest across the chassis 102 in the neutral state. The compartment 104 may be configured to be lifted from the chassis 102 in a collision state. For example, when a collision is detected, a rear of the compartment 104 may rotate along the right rear pillar 110R and the left rear pillar 110L and a front of the compartment 104 may be lifted off of the right front pillar 112R and the left front pillar 112L.

A front end 116 of the vehicle 50 is shown. The right front pillar 112R and the left front pillar 112L may be inclined to enable the chassis 114 to provide space for components of the vehicle 50 in the front end 116 (e.g., the steering wheel column, the engine, the battery, fluids, safety sensors, etc.).

Figure 4:
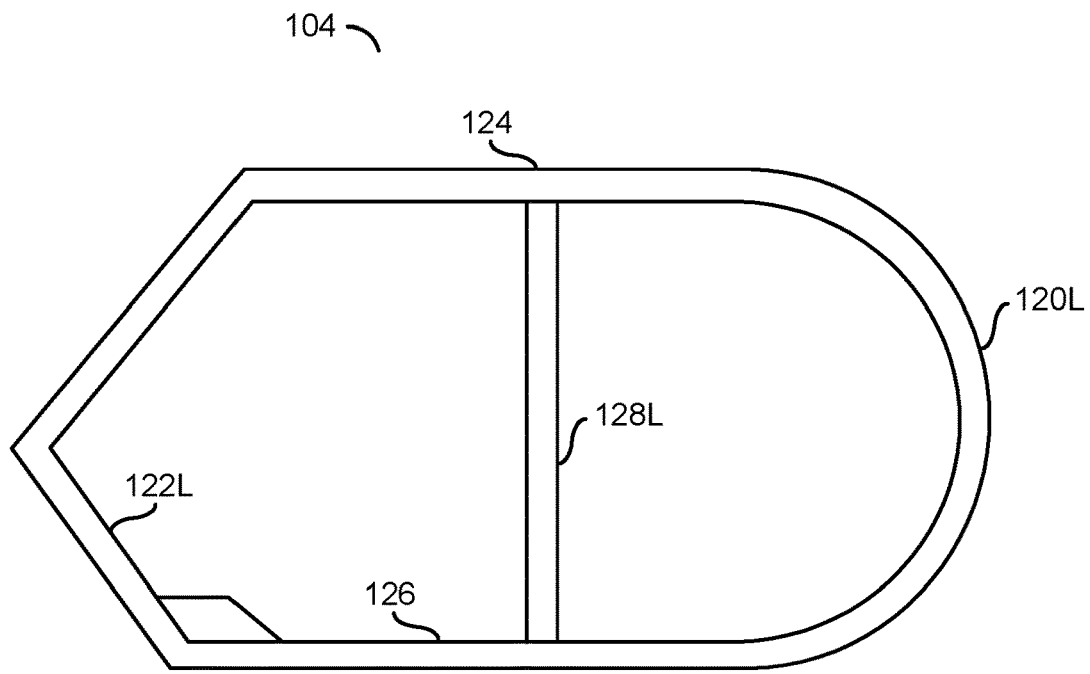
FIG. 4 is a diagram illustrating a left side of a compartment having the rear pillar on shape of arc, a straight middle pillar, a front pillar inclined, a base and a roof.

Referring to FIG. 4, a diagram illustrating the left side of the compartment 104 is shown. The compartment 104 may have a left rear compartment pillar 120L in the shape of an arc, a left front compartment pillar 122L with an inclined shape, a left middle compartment pillar 128L in a straight shape, a compartment base 126 and/or a compartment roof 124.

The left rear compartment pillar 120L may have an arc shape configured to fit the arc shape of the left rear pillar 110L of the chassis 102. The left front compartment pillar 122L may have an inclined shape configured to fit the inclined shape of the left front pillar 112L of the chassis 102. The compartment base 126 may rest on the base 114 of the chassis 102. The roof 124 and the left middle compartment pillar 128L may provide structural support for the compartment 104.

Figure 5:
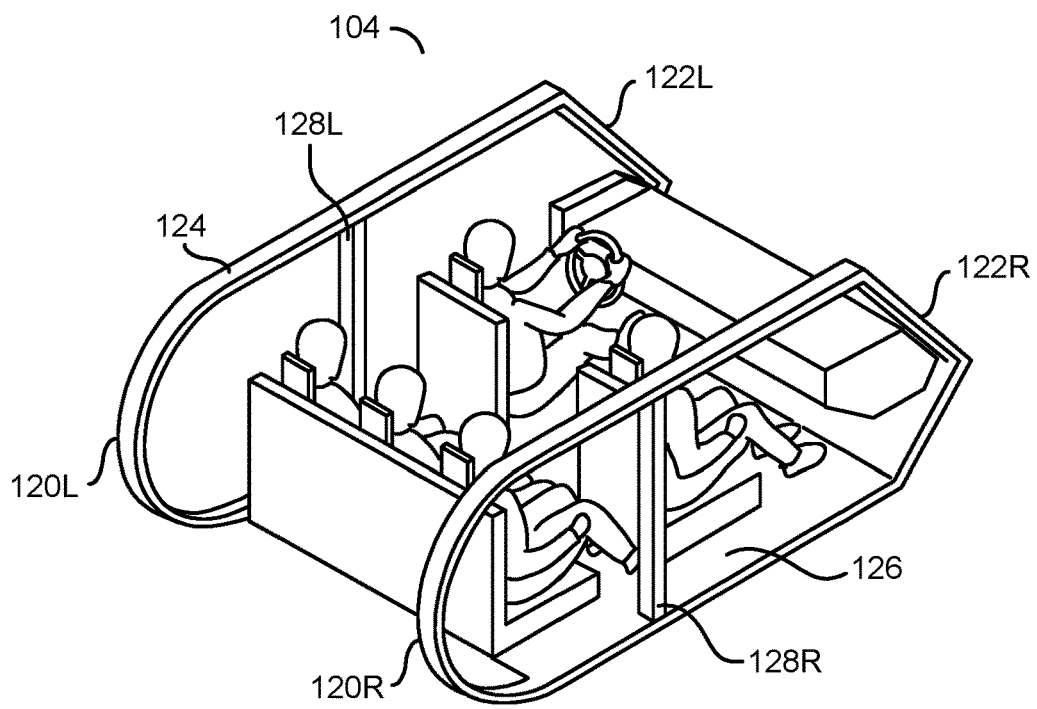
FIG. 5 is a diagram illustrating a 3D view of the whole body of the compartment, seats, and occupants.

Referring to FIG. 5, a diagram illustrating the 3D view of the whole compartment 104 body is shown. The compartment 104 may have a right front pillar 122R and a left front pillar 122L, a right rear pillar 120R and a left rear pillar 120L, a right middle pillar 128R and a left middle pillar 128L, a base 126 (e.g., all the area under the seats and the occupants) and/or a roof 124 on the top of the pillars.

Generally, the compartment 104 may have a symmetrical shape. For example, the right rear compartment pillar 120R may have the same arc shape as the left rear compartment pillar 120L and the front right compartment pillar 122R may have a similar implementation as the left front compartment pillar 122L. The compartment base 126 may connect the left side and the right side of the compartment together.

The compartment 104 may be configured to contain the passengers 54a-54n, the seats 56a-56n and/or other components of the vehicle cabin (e.g., the steering wheel 58, the dashboard 60, speakers, an infotainment system, etc.). For example, the compartment base 126 may rest on the chassis base 114 in the neutral position. The compartment 104 may be configured to lift from the chassis base 114 in the event of a collision to lift the passengers 54a-54n to mitigate the effects of the forces of the collision.

Referring to FIG. 6, a diagram illustrating the apparatus 100 comprising two parts is shown. The two parts are the chassis 102 and compartment 104. The compartment 104 may fit inside and/or on the chassis 102. The front left pillar 112L of the chassis 102 may be inclined under the front left pillar 122L of the compartment 104. The internal surface of the left rear pillar 110L of the chassis 102 may fit against the external surface of the left rear pillar 120L of the compartment 104. A groove 130L and a slider 140L is shown between the left rear pillar 110L and the left rear compartment pillar 120L. The groove 130L and the slider 140L may enable the compartment 104 to move with respect to the chassis 102. For example, the left rear compartment pillar 120L may rotate along the left rear pillar 110L of the chassis 102.

The right side of the body and/or frame (e.g., the chassis 102 and the compartment 104) of the vehicle 50 may be similar to the left side. For example, the front right pillar 112R of the chassis 102 may be inclined under the front right pillar 122R of the compartment 104. The internal surface of the right rear pillar 110R of the chassis 102 may fit against the external surface of the left rear pillar 120R of the compartment 104. The base 126 of the compartment 104 may sit on the base 114 of the chassis 102. Similarly, the right side of the frame may comprise the groove 130R and a slider 140R between the left rear pillar 110R and the left rear compartment pillar 120R. The groove 130R and the slider 140R may enable the compartment 104 to move with respect to the chassis 102. For example, the left rear compartment pillar 120R may rotate along the left rear pillar 110R of the chassis 102.

Referring to FIG. 7, a diagram illustrating a view of the rear compartment pillar 120L having the groove 130L in the middle, and the slider 140L on the side is shown. The groove 130L may be a cutout portion of the exterior side of the rear compartment pillar 120L. The slider 140L may have an arc shape. The size and/or radius of the arc of the slider 140L may be similar to the size and/or radius of the arc of the groove 130L.

Similarly, the groove 130R may be in the middle of the right rear compartment pillar 120R and the slider 140L may be on the side of the right rear compartment pillar 120R. The groove 130R may have a similar implementation as the groove 130L. The slider 140R may have a similar implementation as the slider 140L.

Referring to FIG. 8, a diagram illustrating an alternate view of the left rear pillar 120L having the groove 130L in the middle, and the slider 140L on the side is shown. The groove 130L is located in the middle of the pillar 120L, and may be opened from the external surface of the pillar 120L. The slider 140L may have a shape of an arc and may be located on the side of the pillar 120L.

The groove 130L may comprise edges 132La-132Lb. The edge 132La may be located at one end of the groove 130L and the edge 132Lb may be located at the other end of the groove 130L. The groove 130L may be configured to accept an insert (e.g., a wheel, to be described in association with FIG. 9 and FIG. 10). The groove 130L may act as a guide for the insert to enable the insert to slide along the groove 130L. The edges 132La-132Lb may stop the insert. The edges 132La-132Lb may provide a limit for how far the insert may slide within the groove 130L. The edges 132La-132Lb may be used to limit the range of rotation of the compartment 104.

The slider 140L may comprise a stopper 142L. While the stopper is shown on one end of the slider 140L, the slider 140L may further comprise a stopper on the opposite end. The slider 140L may comprise a track 144L. The track 144L may be configured to accept an insert (e.g., a wheel, to be descried in association with FIG. 9 and FIG. 10). The track 144L may provide a guide for the insert to enable the insert to slide within the slider 140L. The stopper 142L may stop the insert. The stopper 142L may provide a limit for how far the insert may slide within the track 144L. The stopper 142L may be used to limit the range of rotation of the compartment 104.

Figure 9:
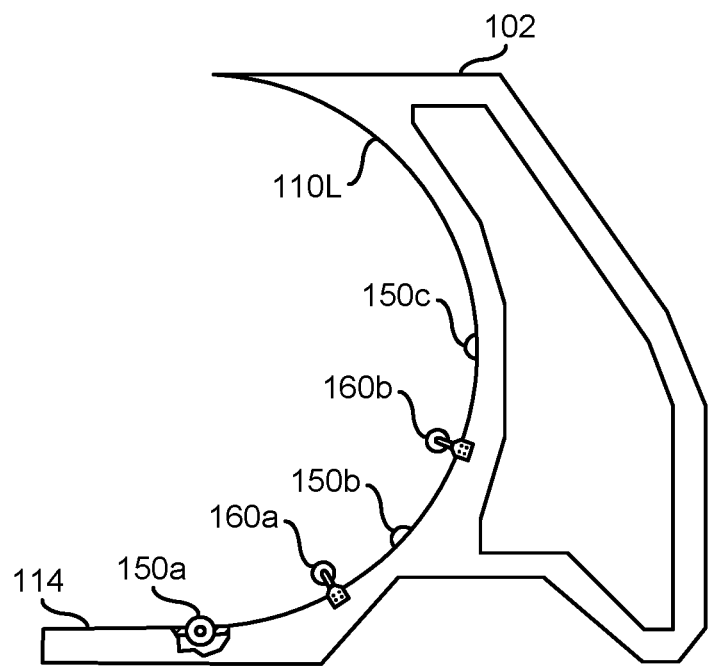
FIG. 9 is a diagram illustrating a view of three wheels installed in the middle of the rear pillar of the chassis and two wheels installed on the side of the rear pillar of the chassis.

Referring to FIG. 9, a diagram illustrating a view of three wheels 150a-150c installed in the middle of the rear pillar 110L of the chassis 102 and two wheels 160a-160b installed on the side of the rear pillar 110L of the chassis 102 is shown. The left side rear pillar 110L may comprise the three wheels 150a-150b-150c. The wheels 150a-150c may be installed in the middle of the inner arc of the rear pillar 110L. As an example, a portion of the left side rear pillar 110L is shown as cutaway to illustrate the installation of the wheel 150a. The left side rear pillar 110L may comprise the two wheels 160a-160b. The wheels 160a-160b may be installed on the side of the inner arc of the rear pillar 110L. The wheels 160a-160b may extend above a surface of the inner arc of the rear pillar 110L. While three wheels 150a-150c and two wheels 160a-160b are shown, the number of either of the wheels may be varied according to the design criteria of a particular implementation.

Similarly, the wheels 150a-150c may be implemented in the middle of the right pillar 110R and the wheels 160a-160b may be implemented on the side of the right rear pillar 110R. The wheels 150a-150c and the wheels 160a-160b may have a similar implementation when on the right pillar 110R as when on the left rear pillar 110L.

Figure 10:
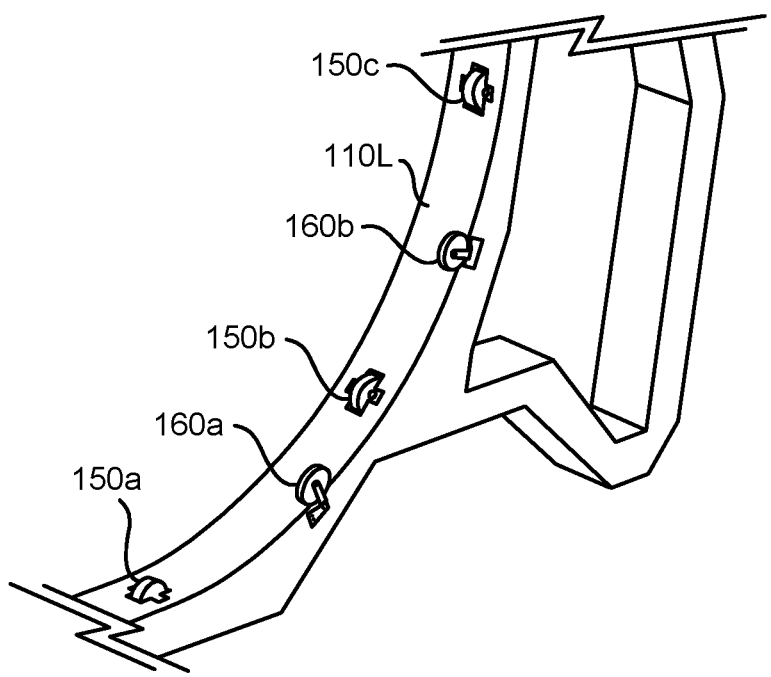
FIG. 10 is a diagram illustrating an alternate view of three wheels installed in the middle of the rear pillar of the chassis and two wheels installed on the side of the rear pillar of the chassis.

Referring to FIG. 10, a diagram illustrating the wheels 150 on the left rear pillar 110L or the right rear pillar 110R of the chassis 102 are shown. The three wheels 150a-150c are shown located down the middle of the rear pillar 110L. The wheels 150a-150c may be configured to insert into the groove 130L. The wheels 150a-150c may slide within the groove 130L to enable the compartment 104 to rotate along the chassis 102. For example, the wheels 150a-150c may extend from the left rear pillar 110L and lock within the groove 130L. The edges 132La-132Lb may prevent the wheels 150a-150c from travelling past the groove 130L. For example, the wheel 150c may hit the edge 132La to restrict the range of rotation of the compartment 104 in one direction and the wheel 150a may hit the edge 132Lb to restrict the range of rotation of the compartment 104 in the other direction.

The wheels 160a-160b may be configured to insert into the slider 140L. The wheels 160a-160b may lock into the track 144L. The wheels 160a-160b may rotate within the track 144L to enable the compartment 104 to rotate along the chassis 102. The stopper 142L may prevent the wheels 160a-160b from travelling beyond the track 144L. For example, the wheel 160a may hit the stopper 142L to restrict the range of rotation of the compartment 104.

The opening of the groove 130L and the opening of the track 144L may be in opposite directions to lock the wheels 150a-150c and/or the wheels 160a-160b in place. For example, the side wheels 160a-160b may fit over the slider 140L and into the track 144L. Since the wheels 160a-160b fit over the slider 140L, the wheels 160a-160b may prevent the rear compartment pillar 120L of the compartment 104 from pulling away from the rear pillar 110L of the chassis 102.

Figure 11:
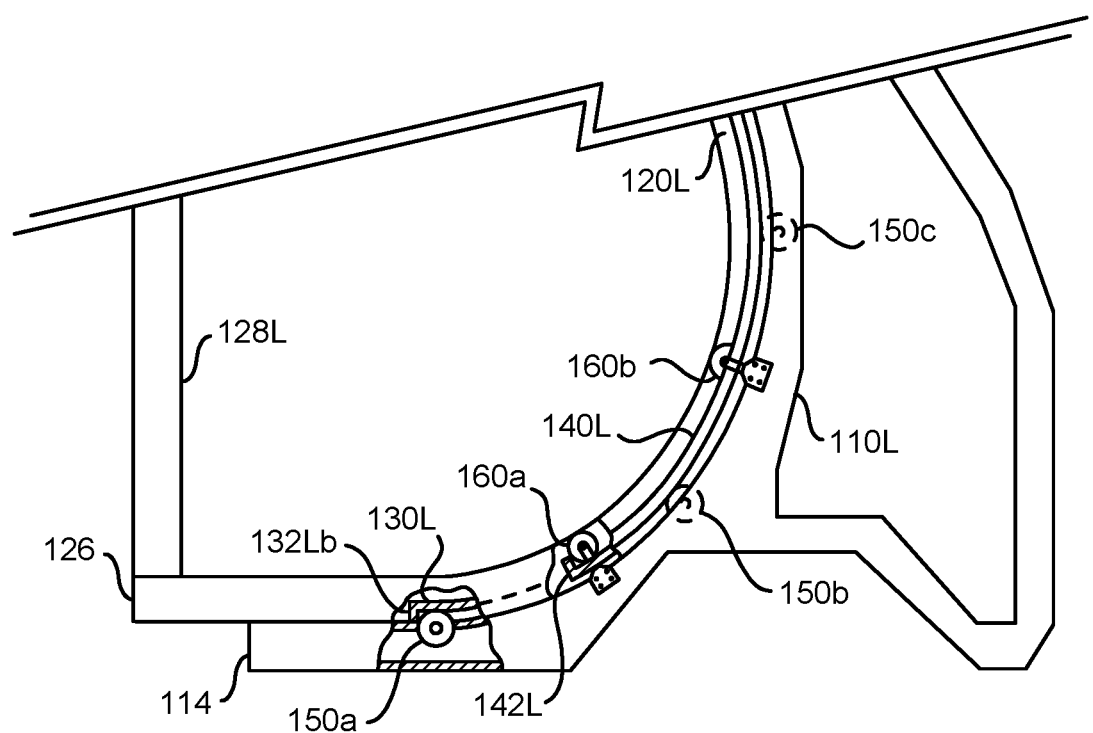
FIG. 11 is a diagram illustrating a view of the rear part of the compartment attached to the rear part of the chassis by wheels.

Referring to FIG. 11, a diagram illustrating a view of the rear part of the compartment 104 attached to the rear part of the chassis 102 by the wheels 106a-106b is shown. The connection of the compartment 104 to the chassis 102 from the left side is shown. However, the connection of the compartment 104 and the chassis 102 may have a similar implementation for the right side. From the left side, the internal surface of the left rear pillar 110L of the chassis 102 may fit against (e.g., surround) the external surface of the left rear pillar 120L of the compartment 104. The three wheels 150a-150b-150c on the left rear pillar 110L fit inside the groove 130L of the left rear pillar 120L. The two wheels 160a-160b on the left rear pillar 110L fit inside the slider 140L on the side of the left rear pillar 120L The right side, (e.g., the right rear pillar 110R of the chassis 102 and the right rear pillar 120R of the compartment 104) may have a similar implementation.

In the example shown, a portion of the chassis 102 and the compartment 104 is shown as cutaway for illustrative purposes (e.g., to show the wheel 150a within the groove 130L). A portion of the wheel 150a is shown within the left rear chassis pillar 110L (e.g., where the wheel 150a is secured). A portion of the wheel 150a may extend above the inner surface of the left rear pillar 110L to fit within the groove 130L of the rear compartment pillar 120L. The wheel 150a is shown against the edge 132Lb. The edge 132Lb may prevent the compartment 104 from rotating in one direction beyond a particular point (e.g., prevent the front of the compartment 104 from being angled downwards).

In the example shown, the wheels 160a-160b are shown in the slider 140L. The wheels 160a-160b may be configured to prevent the compartment 104 from pulling away from the chassis 102. The wheel 160a is shown next to the stopper 142L The stopper 142L may prevent the compartment 104 from rotating in one direction beyond a particular point (e.g., prevent the front of the compartment 104 from being angled downwards). The compartment 104 may be in the default configuration (e.g., for driving and/or normal vehicle usage). The compartment 104 may be in the default configuration when the wheel 150a is against the edge 132Lb and the wheel 60a is against the stopper 142L.

Figure 12:
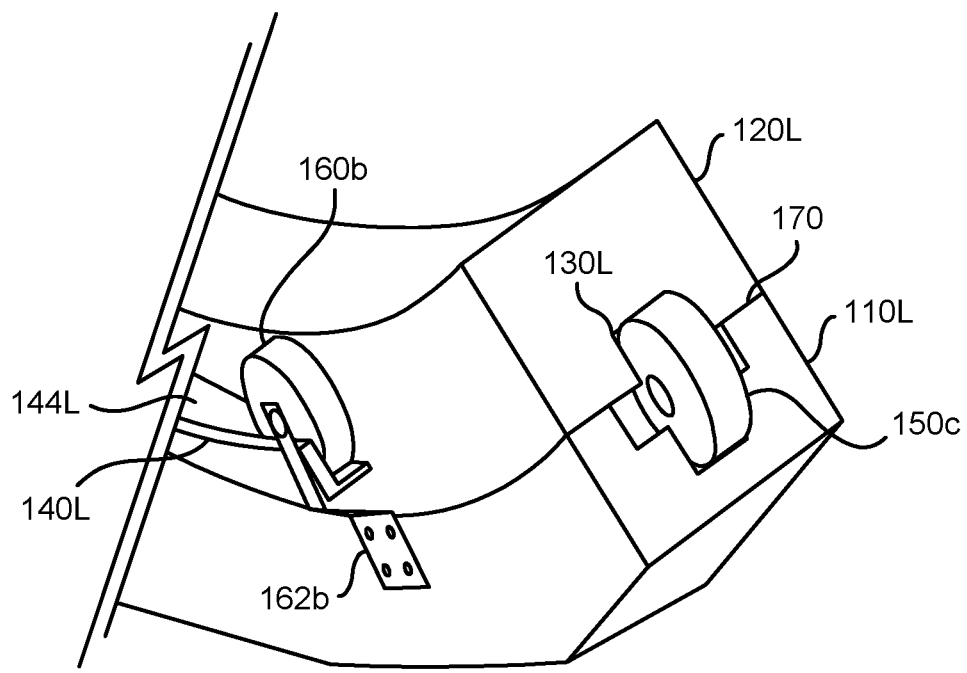
FIG. 12 is a diagram illustrating a view of the middle wheels in the rear pillar of the chassis fitting inside the middle groove of the compartment and the side wheels fitting on the slider of the compartment.

Referring to FIG. 12, a diagram illustrating a view of one of the middle wheels 150c in the rear pillar 110L of the chassis 102 fitting inside the middle groove 130L of the compartment 104 is shown. One of the side wheels 160b fitting on the slider 140L of the compartment 104 is also shown. The wheel 150c may facilitate the rotation of the rear compartment pillar 120L along the inner surface of the rear chassis pillar 110L.

The wheel 160b is shown in the track 114L of the slider 140L. A mount 162b is shown. The mount 162b may connect to the wheel 160b. Similarly, each of the wheels 160a-160b (and any other side wheels implemented) may have a respective mount (e.g., 162a-162b). The mount 162b is shown attached to a side of the rear chassis pillar 110L. The mount 162b may secure the wheel 160b to the chassis 102. The mount 162b may help hold the compartment 104 to the chassis 102 when the wheel 160b is in the slider 140L.

A gap 170 is shown between the rear left compartment pillar 120L and the rear left chassis pillar 110L. The gap 170 may be approximately a few millimeters in distance. The gap 170 may be created between the rear pillars of the chassis 102 and the rear pillars of the compartment 104. For example, there may be the gap 170 between the left rear compartment pillar 120L and the left rear chassis pillar 110L and a similar gap between the right rear compartment pillar 120R and the right rear chassis pillar 110R. The gap 170 may be implemented to allow and/or facilitate a rotation of the compartment 104.

Figure 13:
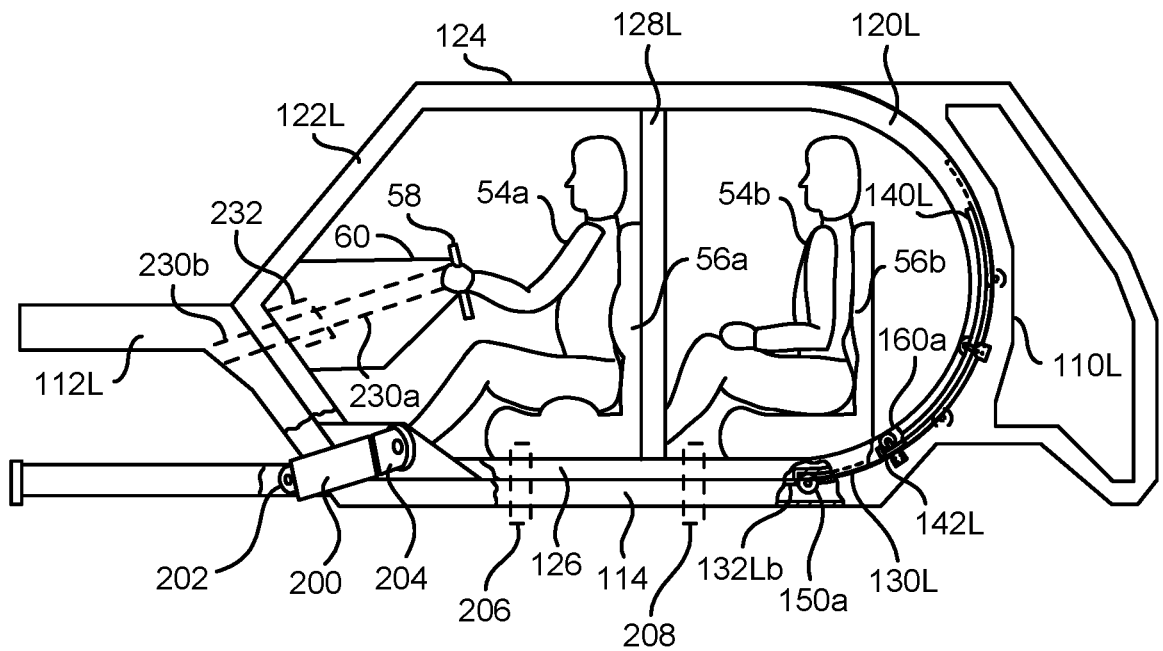
FIG. 13 is a diagram illustrating a piston leaning slightly upwards in the front under the compartment.

Referring to FIG. 13, a diagram illustrating the front left and the base of the frame and the position of a piston is shown. The passengers are seated on the seats 56a-56b, the seats 56a-56b are fixed on the base 126 inside the compartment 104. The compartment base 126 is resting on the chassis base 114. The bottom surface of the compartment base 126 is facing the top surface of the chassis base 114. On the left side, the left front pillar 122L of the compartment 104 is resting on the front left pillar 112L of the chassis 102, and the bottom surface of the left front pillar 122L is facing the top surface of the left front pillar 112L. The right side is similar to the left side. The right front pillar 122R of the compartment 104 is resting on the front right pillar 112R of the chassis 102, and the bottom surface of the right front pillar 122R is facing the top surface of the right front pillar 112R.

A piston 200 is located in the front of the frame under the compartment 104. The piston 200 may lean slightly upwards as shown. The piston 200 may comprise a piston cap 202 and/or a piston rod 204. The piston cap 202 may be attached to the chassis 102. The piston rod 204 may be attached to the compartment 104.

The apparatus 100 may be shown in the default (e.g., driving) orientation. In the default orientation, the compartment 104 may be fully on top of the chassis 112. For example, in the default position, the compartment base 126 may be parallel to the chassis base 114. In the example shown, a portion of the chassis 102 and a portion of the compartment 104 is shown cutaway for illustrative purposes. The wheel 150a is shown in the cutaway portion. In the default position, the wheel 150a may be against the edge 132Lb of the groove 130L. In the default position, the wheel 160a may be against the stopper 142L of the slider 140L.

A locking mechanism 206 and a locking mechanism 208 are shown. The locking mechanisms 206-208 may be configured to lock (e.g., hold) the compartment 104 to the chassis 102. The locking mechanisms 206-208 may be releasable. The locking mechanisms 206-208 may be configured to enable the compartment 104 to rotate (e.g., slide along) the chassis 102 while preventing the compartment 104 from separating from the chassis 102. In the default orientation, the locking mechanism 206 and the locking mechanism 208 may be closed (e.g., locked) and holding the compartment 104 to the chassis 102.

A releasable steering gear shaft (e.g., I-shaft) 230a-230b may be implemented. The releasable steering gear shaft 230a-230b may comprise two components that may be joined to operate as a single component. The releasable steering gear shaft 230a-230b may enable the vehicle 50 to react to the steering wheel 58. A block (or circuit, or component) 232 is shown. The block 232 may implement a steering shaft release.

The steering shaft release 232 may be configured to connect the two components of the releasable steering gear shaft 230a-230b. The steering shaft release 232 may be configured to separate the component 230a from the component 230b of the releasable steering gear shaft 230a-230b. In some embodiments, the locking mechanisms 206-208 and/or the steering shaft release 232 may be mechanical components. In some embodiments, the locking mechanisms 206-208 and/or the steering shaft release 232 may be electronic components (e.g., controlled by a processor) configured to control an actuator (e.g., for releasing the releasable steering gear shaft 230a-230b, for releasing the compartment 104, etc.). The type of component used to control the locking mechanisms 206a-206b and/or the steering shaft release 232 may be varied according to the design criteria of a particular implementation.

Releasing the component 230a from the component 230b of the releasable steering gear shaft 230a-230b may enable the compartment 104 to lift away from the chassis 102. In the default orientation, the steering shaft release 232 may be configured to couple the two components of the releasable steering gear shaft 230a-230b. When the releasable steering gear shaft 230a-230b is coupled, the driver 54a may operate the steering wheel 58, and the releasable steering gear shaft 230a-230b may translate the movements of the steering wheel 58.

Figure 14:
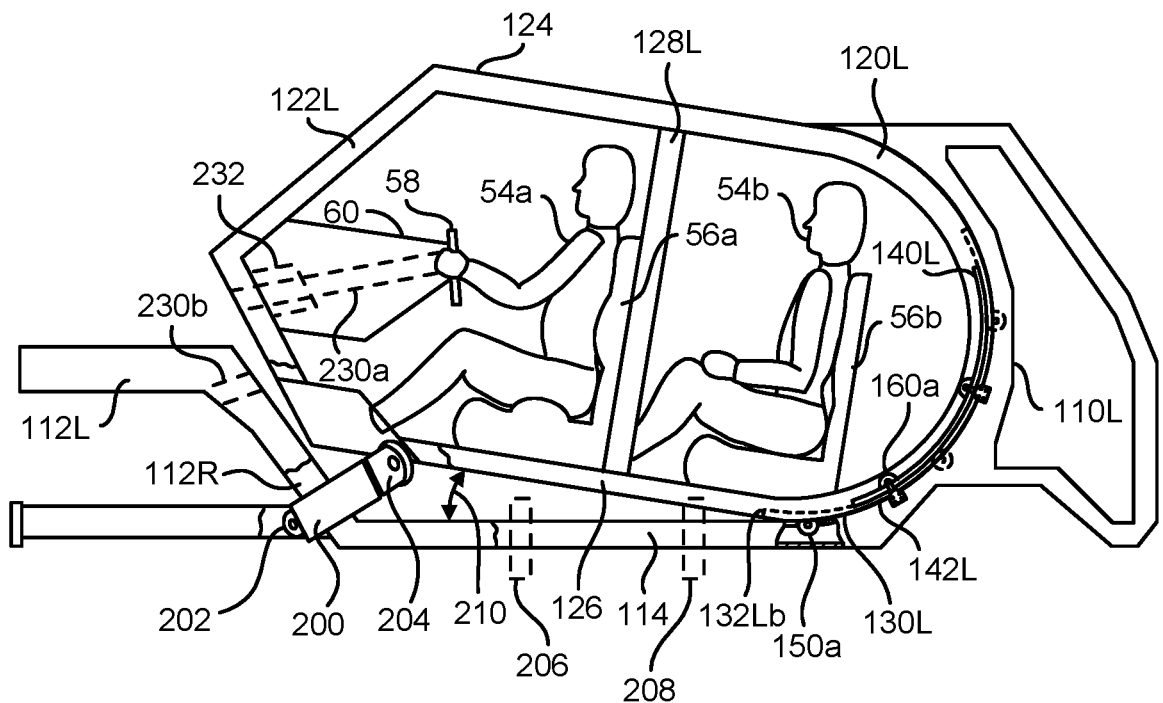
FIG. 14 is a diagram illustrating the piston lifting the compartment a few inches.

Referring to FIG. 14, a diagram illustrating the piston 200 lifting the compartment 104 a few inches is shown. An angle 210 is shown. The angle 210 may be an angle between the chassis base 114 and the compartment base 126. The piston 200 may be configured to extend. Extending the piston 200 may lift the compartment 104. The compartment base 126 may take off from the chassis base 114.

The left front pillar 122L may be lifted from the left front pillar 112L. Similarly, on the right side, the right front pillar 122R may be lifted from the right front pillar 112R. The rear of the compartment 104 stays in the same level as shown (e.g., the left rear pillar 120L of the compartment 104 may not be lifted up). The left rear pillar 120L may rotate a few degrees along the inner surface of the left rear pillar 110L of the chassis 102. The right side may have a similar implementation to the left side. For example, the right rear pillar 120R of the compartment 104 may not be lifted up. The right rear pillar 120R may rotate a few degrees along the inner surface of the right rear pillar 110R of chassis 102.

The angle 210 may represent an amount the compartment 104 has been lifted from the chassis 102. The passengers 54a-54b and/or the seats 56a-56b are also lifted because they are within the compartment 104. When the compartment 104 has been lifted at the angle 210, the apparatus 100 may no longer be in the default orientation. In one example, the apparatus 100 may move from the default orientation in response to a front impact. For example, as the compartment 104 moves out of the default position, the compartment base 126 may no longer be parallel to the chassis base 114. In the example shown, a portion of the chassis 102 and a portion of the compartment 104 is shown cutaway for illustrative purposes. The wheel 150a is shown in the cutaway portion. As the compartment 104 moves out of the default position, the wheel 150a may move away from the edge 132Lb of the groove 130L. As the compartment 104 moves out of the default position, the wheel 160a may move away from the stopper 142L of the slider 140L.

To enable the compartment 104 to be raised from the default orientation, the locking mechanism 206 and/or the locking mechanism 208 may be unlocked. The enable the compartment 104 to rotate with respect to the chassis 102, the locking mechanism 206 and/or the locking mechanism 208 may be unlocked. As the compartment 104 moves away from the default orientation, the locking mechanism 206 and/or the locking mechanism 208 may release to enable the compartment 104 to be raised and/or rotate. If the compartment 104 is lowered back to the default orientation, the locking mechanism 206 and/or the locking mechanism 208 may re-lock to hold the compartment 104 to the chassis 102.

To enable the compartment 104 to be raised from the default orientation, the steering wheel release 232 may de-couple the releasable steering gear shaft 230a-230b. The component 230b of the releasable steering gear shaft 230a-230b may remain with the chassis 102. The component 230a of the releasable steering gear shaft 230a-230b may be raised along with the compartment 104. For example, when the steering wheel release 232 de-couples the releasable steering gear shaft 230a-230b, the steering wheel 58 may no longer be able to control the vehicle 50. If the compartment 104 is lowered back to the default orientation, the steering wheel release 232 may re-couple the components of the releasable steering gear shaft 230a-230b.

Figure 15:
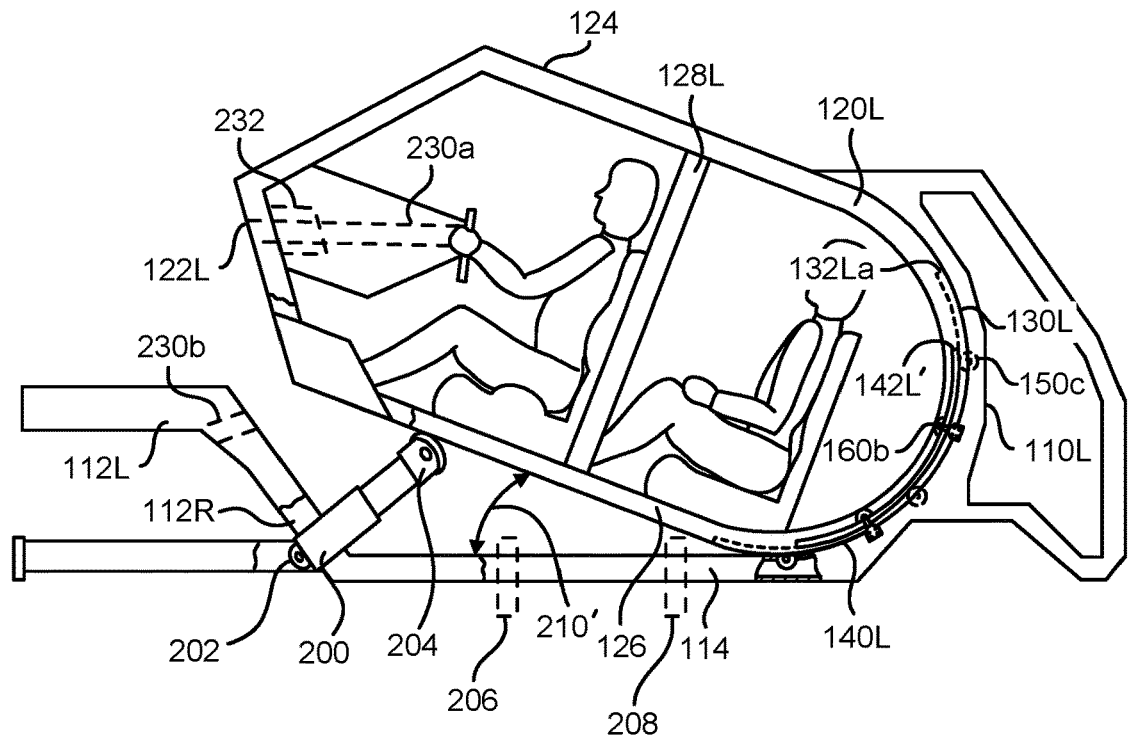
FIG. 15 is a diagram illustrating the compartment lifted up from the front by the piston while the rear part is rotated at the same level because of the pivotal attachment with the chassis.

Referring to FIG. 15, a diagram illustrating the piston 200 lifting the compartment 104 is shown. In the example shown in FIG. 15, the piston 200 may be extended causing the angle 210' between the chassis base 114 and the compartment base 126. In an example, the angle 210 shown in association with FIG. 14 may be smaller than the angle 210' shown in association with FIG. 15 (e.g., which means the compartment 104 goes up higher and the front end of the compartment 104 is at a higher angle). For example, in the example shown in FIG. 15, the left front pillar 122L may be lifted more from the left front pillar 112L than shown in association with FIG. 14 and the right front pillar 122R may be lifted more from the right front pillar 112R than shown in association with FIG. 14.

The rear of the compartment 104 may stay at the same level (e.g., the rear of the compartment 104 may not be lifted as the front of the compartment 104 is lifted by the piston 200). The left rear pillar 120L of the compartment 104 shown in association with FIG. 15 may rotate more along the inner surface of the left rear pillar 110L compared to the example shown in FIG. 14. Similarly, the right rear pillar 120R of the compartment 104 shown in association with FIG. 15 may rotate more along the inner surface of the right rear pillar 110R of the chassis 102 compared to the example shown in FIG. 14. The passengers 54a-54b and/or the seats 56a-56b may be inclined backwards.

The angle 210' may represent an amount the compartment 104 has been lifted from the chassis 102. The passengers 54a-54b and/or the seats 56a-56b are also lifted because they are within the compartment 104. When the compartment 104 has been lifted at the angle 210', the apparatus 100 may no longer be in the default orientation and may not have reached a fully extended orientation. For example, as the compartment 104 moves towards the fully extended position, the compartment base 126 may no longer be parallel to the chassis base 114. As the compartment 104 moves towards the fully extended position, the wheel 150c may move towards the edge 132La of the groove 130L. As the compartment 104 moves towards the fully extended position, the wheel 160b may move towards the stopper 142L' of the slider 140L.

Figure 16:
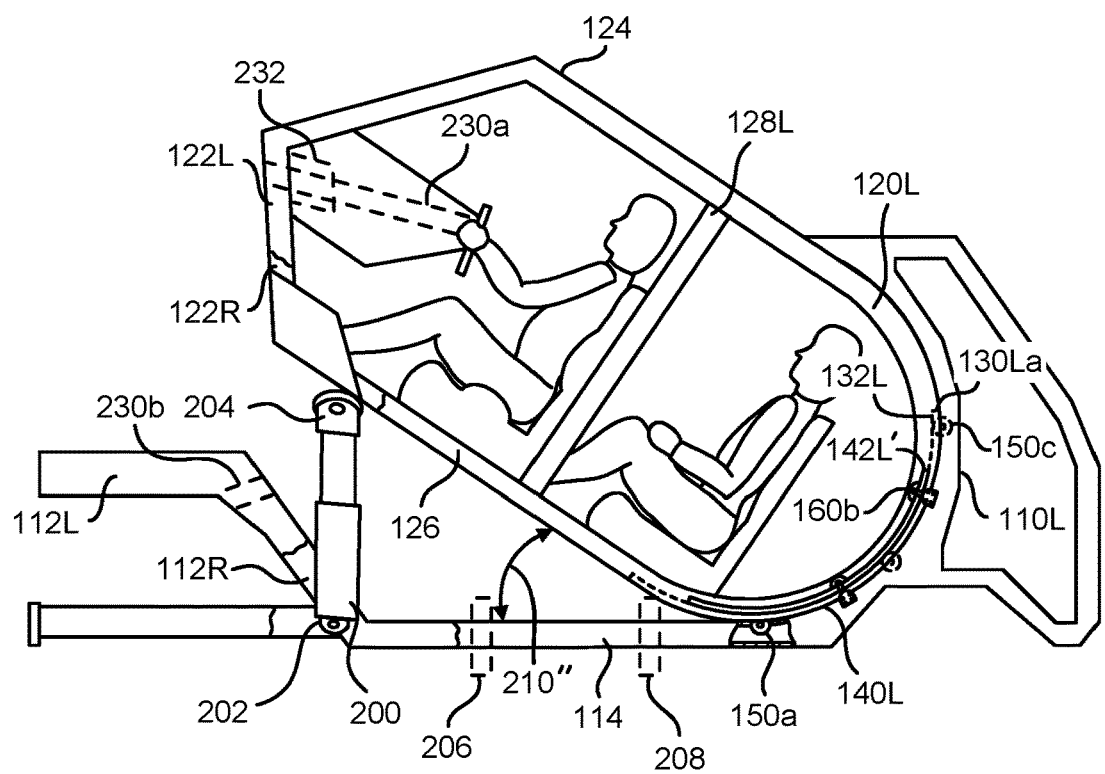
FIG. 16 is a diagram illustrating a diminished distance between the front and the rear pillars of the chassis.

Referring to FIG. 16, a diagram illustrating the diminished distance between the front pillars and the rear pillars of the chassis 102 is shown. In the example shown in association with FIG. 16, the apparatus 100 may be in the fully extended position. The apparatus 100 may move from the default orientation to the fully extended orientation in response to a front impact and/or a rear impact. Due to the front impact received during a crash, the front of the chassis base 114 may collapse and/or the front pillars 112L and/or 112R of the chassis 102 may shift back. For example, a crumple zone of the vehicle 50 may cause the shape of the vehicle 50 to change (e.g., the front end 116 may become shorter).

When the front pillars 112L and/or 112R shift back, the piston 200 may become straight (e.g., vertical) as shown by the angle 210". The change of the piston 200 from the angle 210' (e.g., leaning upwards as shown in FIG. 15) to the angle 210" (e.g., straight vertical) may cause an increase in the amount that the compartment 104 is raised. As shown, the piston 200 may be fully extended and/or in a straight vertical position. When the piston 200 is straight (e.g., vertical), the compartment 104 may be lifted to a highest position (e.g., the fully extended orientation).

The rear of the compartment 104 may stay at the same level (e.g., the rear of the compartment 104 may always stay at the same level as the front of the compartment 104 is lifted). In the example shown in FIG. 16, the left rear pillar 120L of the compartment 104 may rotate more along the inner surface of the left rear pillar 110L compared to the example shown in FIG. 15. Similarly, in the example shown in FIG. 16, the right rear pillar 120R of the compartment 104 may rotate more along the inner surface of the right rear pillar 110R of chassis 102 compared to the example shown in FIG. 15. The compartment base 126 may be lifted far from the chassis base 114. The left front pillar 122L may be lifted even higher from the left front pillar 112L and the right front pillar 122R may be lifted even higher from the right front pillar 112R. The passengers 54a-54b are leaning backwards on the seats 56a-56b.

The angle 210" may represent an amount the compartment 104 has been lifted from the chassis 102. The passengers 54a-54b and/or the seats 56a-56b are also lifted because they are within the compartment 104. When the compartment 104 has been lifted at the angle 210", the apparatus 100 may be in the fully extended orientation. For example, in the fully extended position, the compartment base 126 may not be parallel to the chassis base 114. When the compartment 104 reaches the fully extended position, the wheel 150c may move against the edge 132La of the groove 130L. When the compartment 104 reaches the fully extended position, the wheel 160b may move against the stopper 142L' of the slider 140L.

Lifting the compartment 104 to the fully extended position may enable the front pillars 122L-122R of the compartment 104 to clear of the front pillars 112L-112R of the chassis 102. Since the front pillars 112L-112R may be crushed and/or shifted towards the rear of the vehicle 50 by the force of the front impact, lifting the front pillars 122L-122R of the compartment 104 clear of the front pillars 112L-112R may prevent the compartment from being crushed.

Figure 17:
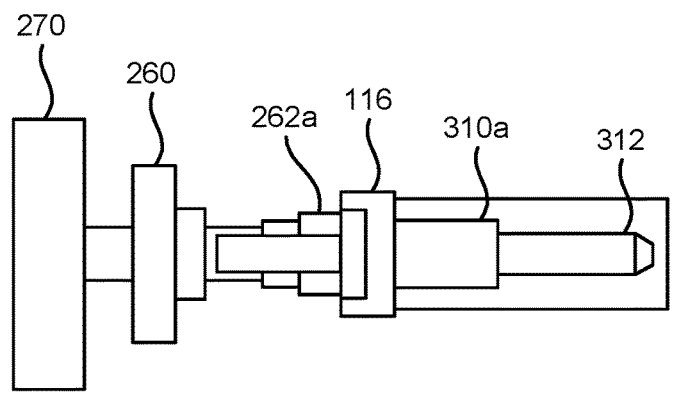
FIG. 17 is a diagram illustrating a side view of the front end of the car before the collision having shock sensors behind the barrier and bumper.

Referring to FIG. 17, a diagram illustrating a side view of the front end 116 of the car 50 before a collision is shown. A barrier 260 may be located behind a bumper 270 of the vehicle 50. The barrier 260 may be attached to the front end 116 of the chassis 102 by supports 262a and 262b. In the example shown, shock sensors 310a-310e may be located behind the barrier 260 and the bumper 270. The shock sensors 310a-310e may be fixed on the front end 116 of the chassis 102 and separated from the barrier 260 with a small gap. A tube 312 is shown. The tube 312 may be a fluid line.

Figure 18:
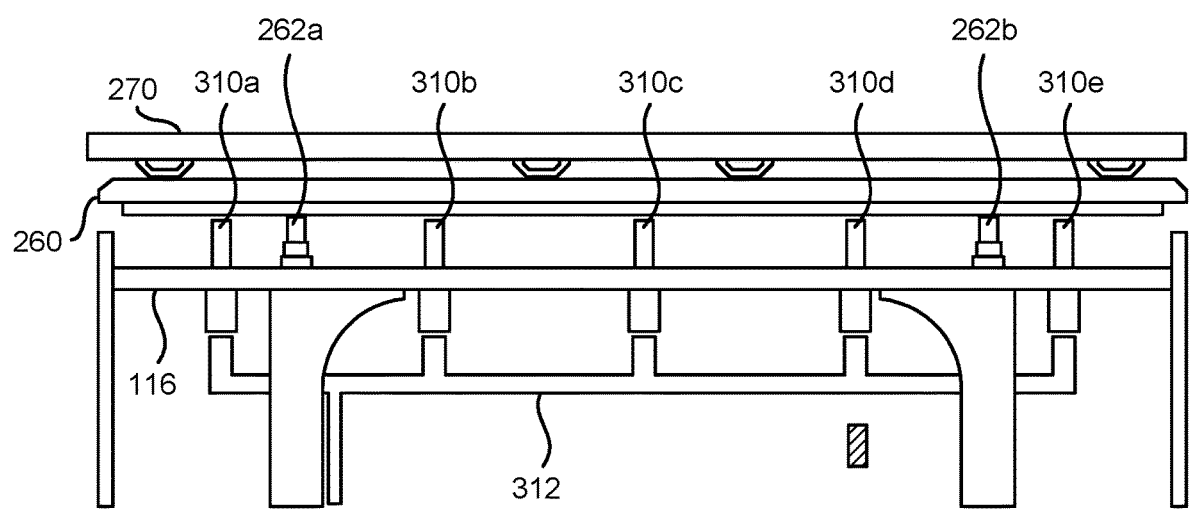
FIG. 18 is a diagram illustrating a top down view of the front end of the car before the collision having shock sensors behind the barrier and bumper.

Referring to FIG. 18, a diagram illustrating a top down view of the front end 116 of the car 50 before the collision is shown. The bumper 270 and the barrier 260 of the front end 116 are shown. The supports 262a-262b are shown between the bumper 270 and the barrier 260. The shock sensors 310a-310e are shown located behind the barrier 116. A portion of the shock sensors 310a-310e are shown alongside the supports 262a-262b. A portion of the shock sensors 310a-310e may be located behind the supports 262a-262b. The shock sensors 310a-310e are shown connected to the fluid line 312.

In the example shown in association with FIG. 18, the shock sensors 310a-310e may not be compressed. The shock sensors 310a-310e may not be compressed when there is no frontal force (e.g., an impact/collision). When the shock sensors 310a-310e are not compressed, the compartment 104 may be in the default orientation.

Figure 19:
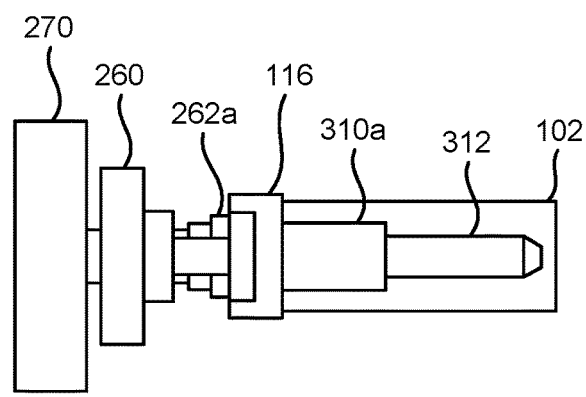
FIG. 19 is a diagram illustrating a side view of the front end of the car after the collision having the bumper and barrier shifted to the back, crushing the supports and pressing the shock sensors.

Referring to FIG. 19, a diagram illustrating the front end 116 of the car 50 after a collision is shown. A front end collision may cause a change of shape of the front end 116 of the vehicle. In the example shown, the barrier 260 may still be located behind the bumper 270 of the vehicle 50. The barrier 260 may be attached to the front end 116 of the chassis 102 by the supports 262a and 262b. The shock sensors 310a-310e may be located behind the barrier 260 and the bumper 270.

The force of the front impact may compress the front end 116 of the vehicle 50. In the example shown in association with FIG. 19, the bumper 270 may be located closer to the barrier 260 than shown in association with FIG. 17. The force of the front collision may crush the supports 262a and/or the shock sensors 310a-310e. The shock sensors 310a-310e may be pressed.

Figure 20:
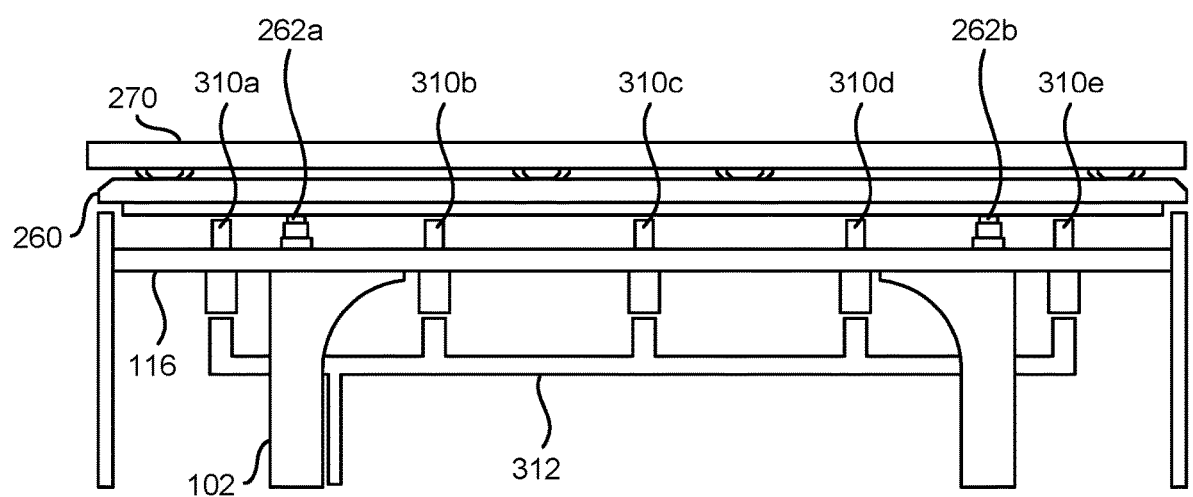
FIG. 20 is a diagram illustrating a top down view of the front end of the car after the collision having the bumper and barrier shifted to the back, crushing the supports and pressing the shock sensors.

Referring to FIG. 20, a diagram illustrating a top down view of the front end 116 of the car 50 after the collision is shown. After the collision, the bumper 270 may shift towards the barrier 260. The barrier 260 may shift towards the front end 116 of the chassis 102. Shifting the barrier 260 may cause the supports 262a and 262b to crash and/or be squeezed. The shock sensors 310a-310e may be compressed.

In the example shown in association with FIG. 20, the shock sensors 310a-310e may be compressed. The shock sensors 310a-310e may be compressed when there is a frontal force (e.g., an impact/collision). Since the line 312 may be a hydraulic fluid line, when the shock sensors 310a-310e are compressed, the pressure in the fluid line 312 may change. The change in pressure may cause the compartment 104 to move to the fully extended orientation. The apparatus 100 may move to the fully extended position in response to the collision.

Figure 21:
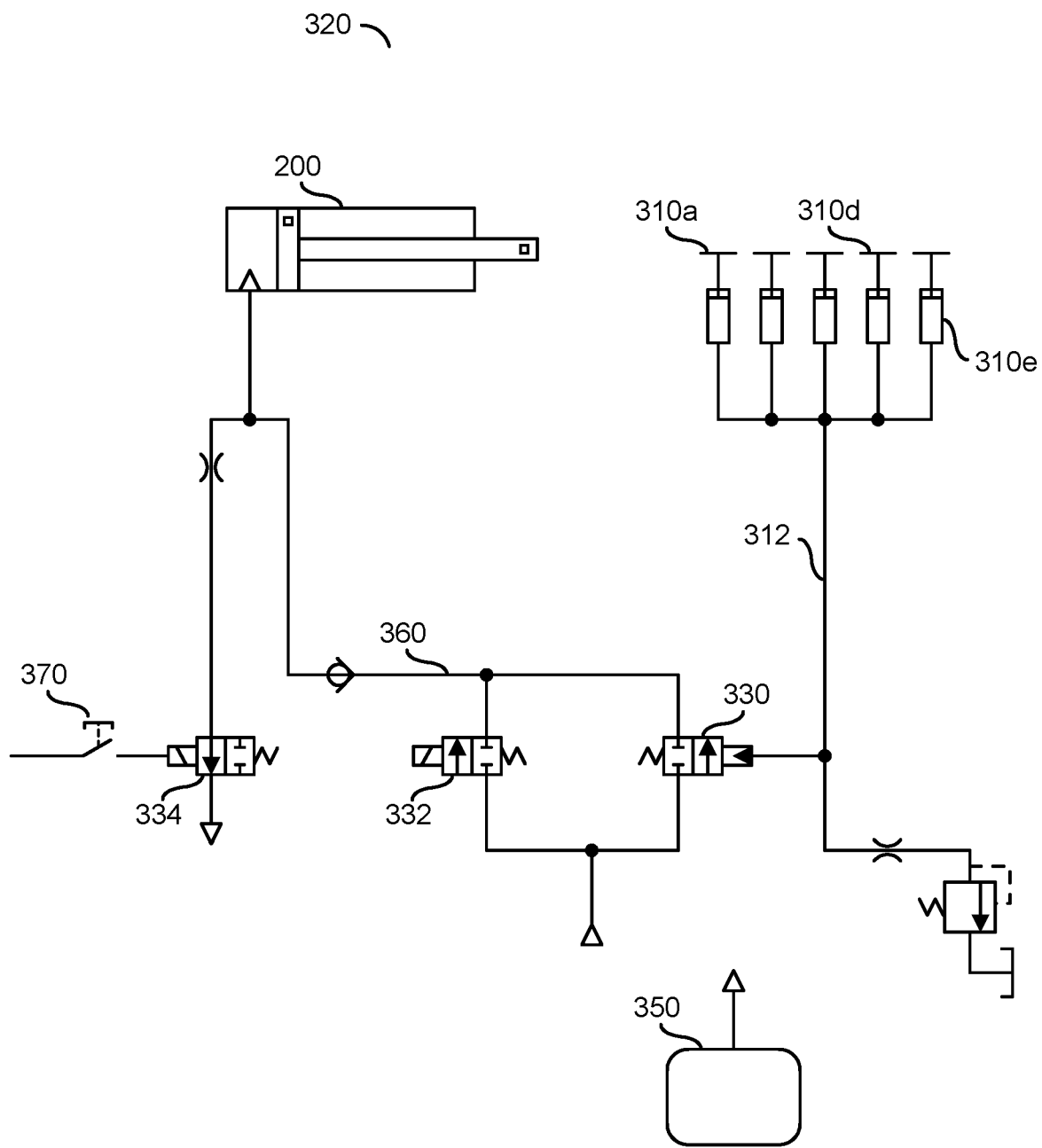
FIG. 21 is a diagram illustrating an example schematic of a hydraulic/pneumatic activation system.

Referring to FIG. 21, a diagram illustrating a schematic 320 of a hydraulic/pneumatic activation system of the apparatus 100 is shown. The schematic 320 may comprise the piston 200, the shock sensors 310a-310e, the hydraulic fluid line 312, a valve 330, a valve 332, a valve 334, an air compressor 350, a line (or tube) 360 and/or a button 370. The schematic 320 of the activation system of the apparatus 100 may comprise other components (not shown). They number, type and/or arrangement of the components of the schematic 320 may be varied according to the design criteria of a particular implementation.

By pressing on one or more of the shock sensors 310a-310e, the hydraulic fluid may flow through the line 312 (e.g., a tube) to the valve 330. The valve 330 may open in response to the hydraulic fluid change. Once the valve 330 is open, compressed air inside the compressor 350 may flow through the line 360 (e.g., a tube) towards the piston 200. The compressed air may cause the piston 200 to extend. Extending the piston 200 may cause the apparatus 100 to move from the default orientation to the fully extended orientation. The impact detected by the shock sensors 310a-310e may cause the piston 200 to change the orientation of the apparatus 100.

Pressing on the button 370 may open the valve 334. Opening the valve 334 may release the air inside the line 360 and/or retract the piston 200. Retracting the piston 200 may move the apparatus 100 from the fully extended position back to the default position.

Figure 22:
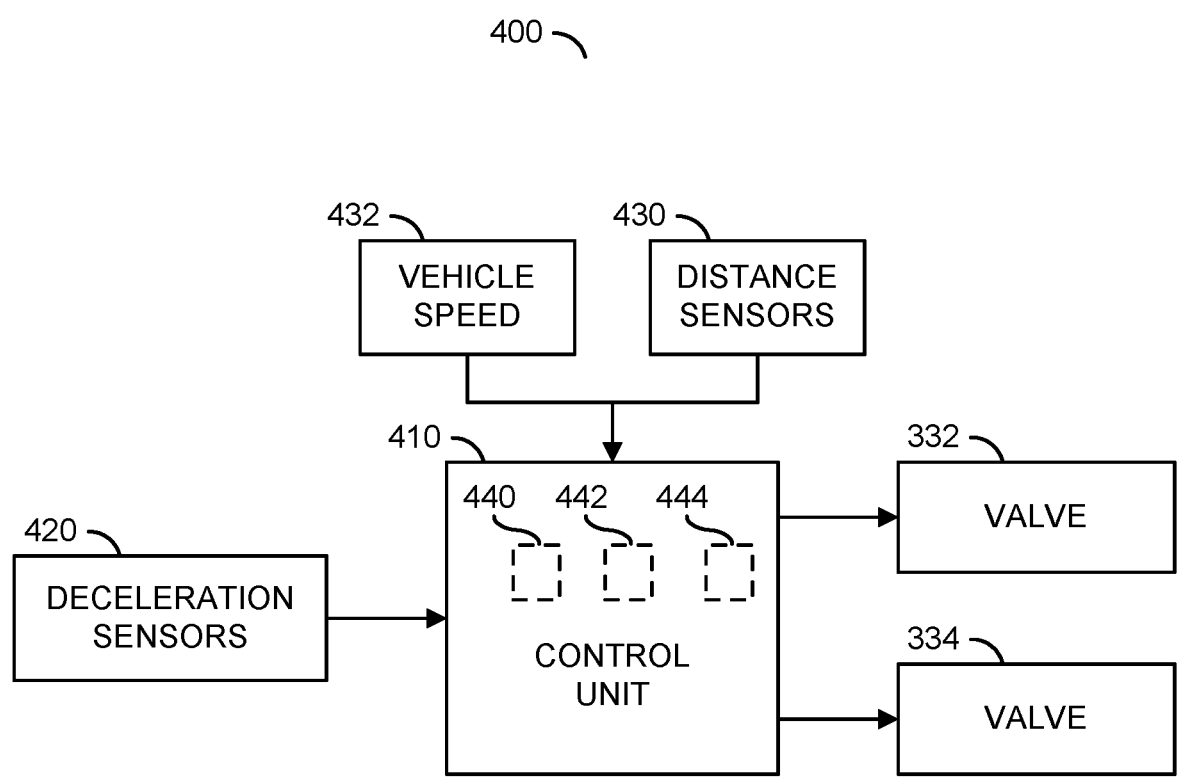
FIG. 22 is a block diagram illustrating the electronic activation system.

Referring to FIG. 22, a block diagram illustrating an electronic activation system 400 is shown. The electronic activation system 400 may comprise the valve 332, the valve 334, a block (or circuit) 410, a block (or circuit) 420, a block (or circuit) 430 and/or a block (or circuit) 432. The circuit 410 may implement a control unit. The circuit 420 may implement deceleration sensors. The circuit 430 may implement distance sensors. The circuit 432 may implement vehicle speed sensors. The electronic activation system 400 may comprise other components (not shown). The number, type and/or arrangement of the components of the electronic activation system 400 may be varied according to the design criteria of a particular implementation.

The control unit 410 may comprise a block (or circuit) 440, a block (or circuit) 442 and/or a block (or circuit) 444. The circuit 440 may implement a processor. The circuit 442 may implement a memory. The circuit 444 may implement an interface. The control unit 410 may comprise other components (not shown). The number, type and/or arrangement of the components of the control unit 410 may be varied according to the design criteria of a particular implementation.

The processor 440 may be configured to execute computer readable instructions. The processor 440 may be configured to read and/or compare data. The processor 440 may be configured to make decisions based on the data received and/or the computer readable instructions.

The memory 442 may be configured to store data. The computer readable instructions may be stored in the memory of the control unit 410. Data readings from the sensors 420, 430 and/or 432 may be stored by the memory 442.

The interface 444 may be configured to send and/or receive data. The interface 444 may be configured to format the received data to a format compatible with the processor 440 and/or the memory 442. The interface 444 may be configured to transmit data in a format compatible with the sensors 420, 430, 432 and/or in a format usable by the valves 332-334.

In some embodiments, the sensors 420-432 may be implemented using accelerometers and/or gyroscopes. In some embodiments, the sensors 420-432 may be implemented based on GPS/GNSS technology. For example, the speed of the vehicle 50 and/or the distance to other objects may be detected based on GPS/GNSS technology. In some embodiments, the sensors 420-432 may be implemented using LIDAR technology. In some embodiments, the sensors 420-432 may be implemented using radar technology. In some embodiments, the sensors 420-432 may be implemented using cameras and/or video technology. For example, the control unit 410 and/or the sensors 420-432 may be configured to implement computer vision and/or object detection to detect collisions and/or potential collisions.

The computer/control unit 410 may receive one or more signals from the deceleration sensor(s) 420, distance sensor(s) 430 and/or the vehicle speed sensor 432. The control unit 410 may be configured to control the valve 332 and/or the valve 334 (e.g., by opening or closing them). When the distance sensor(s) 430 detects that the car 50 is getting closer to an object, the distance sensor(s) 430 may present a signal to the control unit 410. Depending on the speed of the vehicle 50 (e.g., provided by the speed sensor 432), the control unit 410 may determine whether or not to open the valve 332. The control unit 410 may open the valve 332 in response to a signal from the deceleration sensor(s) 420. The control unit 410 may be configured to detect/anticipate front and/or rear collisions. Similarly, the computer/control unit 410 may be configured to control the locking/unlocking of the locking mechanisms 206-208 and/or the coupling/de-coupling of the releasable steering gear shaft 230a-230b by the steering shaft release 232.

In some embodiments, the apparatus 100 may implement the collision detection using the shock sensors 310a-310e. In some embodiments, the apparatus 100 may implement the collision detection using the electronic activation system 400. In some embodiments, the apparatus 100 may implement a combination of the collision detection using the shock sensors 310a-310n and the electronic activation system 400. For example, the electronic activation system 400 may be configured to anticipate a crash and/or impact. By anticipating a crash/impact, the apparatus 100 may be configured to pre-emptively (e.g., before the collision occurs) move the compartment 104 from the default position to the fully extended orientation.

Description of the Working Principle

The apparatus 100 may comprise a safety system. The safety system may be implemented by at least one of the electronic activation system 400 and/or the hydraulic activation system 320. The electronic activation system 400 and/or the hydraulic activation system 320 may be configured to implement a safety measure in response to a signal activating the amount of force (e.g., the amount of force caused by a collision). In one example, the amount of force signal may be generated by the deceleration sensors 420. In another example, the amount of force signal may be generated by the shock sensors 310a-310e. The safety measure may comprise lifting a front of the compartment 104 from the chassis 102 from the default position to the fully extended position. The safety measure may comprise rotating the curved rear compartment pillars (e.g., 120L and 120R) along the curved rear chassis pillars (e.g., 110L and 110R). For example, the compartment 104 may be lifted by extending the piston 200 in response to compressed air. The safety measure may comprise absorbing the force of the collision using the chassis base 114 while the compartment 104 is lifted.

Generally, during normal operation of the vehicle 50, the vehicle 50 may move normally on the road and the electronic system 400 may generate readings (e.g., from the sensors 420, 430 and/or 432). The distance sensor(s) 430 may detect that the car 50 is getting closer to an object (e.g., the distance to the object is getting shorter and/or the speed provided by the vehicle speed sensor 432 may provide a high value). Once the car 50 is at a pre-defined distance (e.g., measured using the distance sensors 430) from the object and with a particular speed (measured using the vehicle speed sensor 432), the control unit 410 may send a signal to open the valve 332. Opening the valve 332 may allow the compressed air to flow from the compressor 350 to the piston 200. The compressed air may cause an extension of the piston 200. Extending the piston 200 may lift the compartment 104 from the default position.

After lifting the compartment 104 a pre-determined distance (e.g., a few inches), the control unit 410 may close the valve 332, which cuts off the flowed air. For example, the piston 200 may lift the compartment 104 a few inches (e.g., 2 inches) creating a gap (e.g., the angle 210) between the chassis 102 and compartment 104 before the car hits the object (as shown in association with FIG. 14). As soon as the car 50 hits the object, the deceleration sensor(s) 420 may present a signal to the control unit 410. The signal from the deceleration sensor(s) 420 may provide information to enable the processor 440 of the control unit 410 to determine an amount of shock force. Depending on the shock force determined by the processor 440, the control unit 410 may determine whether or not to open the valve 332.

In one example, if the car 50 did not hit the object or the car 50 hits the object but the control unit 410 determines the impact was not hard enough (e.g., the amount of force from the collision is below a threshold value of force), the control unit 410 may not open the valve 332. If the control unit 410 does not open the valve 332, the compartment 104 may be prevented from moving up more. After a few seconds, the control unit 410 may send a signal to open the valve 334 to enable a release of the air in the piston 200. Releasing the air using the valve 334 may bring the compartment 104 back to the original place (e.g., default, non-extended) place.

In another example, if the control unit 410 receives a signal from the deceleration sensor(s) 420 and determines that the impact was hard enough to hurt the passengers 54a-54b (e.g., the amount of force from the collision is above a threshold value of force), the control unit 410 may open the valve 332. The rest of compressed air in the compressor 350 may flow to the piston 200 in order to lift the front of compartment 104 more. While the piston 200 is lifting the front of the compartment 104, the right rear pillar 120R and the left rear pillar 120L of compartment 104 may rotate along the inner surface of the rear pillars 110L and 110R of chassis 102. The arc groove 130L (and 130R) in the left rear pillar 120L of the compartment 104 move on the wheels 150a-150c and the sliders 140L (and 140R) may slide on the wheels 160a-160b. The left rear pillars 120L and the right rear pillar 120R of the compartment 104 may slip and/or rotate in the rear pillars 110L and 110R of the chassis 102 (e.g., the compartment 104 may be raised from the front while the rear of the compartment 104 stays on the same level).

The base 114 of the chassis 102 may collapse as a result of the impact. Collapsing the base 114 of the chassis 102 may cause the distance between the front pillars 112L/112R and the rear pillars 110L/110R of the chassis 102 to decrease. The front pillars 112L/112R of the chassis 102 may move toward the rear of the vehicle 50. Since the base of the piston 200 is attached to the front of chassis 102, the piston 200 may move towards the back of the vehicle 50 as well. Moving the piston 200 towards the back may change the angle 210 between the compartment base 126 and the chassis base 114. Increasing the angle 210 may increase the amount of lift of the front of compartment 104 even more (as shown in association with FIG. 16). The compartment 104 may rotate and/or incline upwards by the combination of the elongation of the piston 200 (in response to the compressed air) and the declination of the angle 210 between chassis base 114 and the compartment base 126.

In a situation where the electronic system 400 is not working, the hydraulic/pneumatic system 300 may work. For example, the hydraulic/pneumatic system 300 may implement a back-up system to the electronic system 400. During sudden strong shocks, the passengers 54a-54b and/or the compartment 104 may not stop immediately because the front end of the car 50 is being crushing and absorbing energy. However, when the shock reaches the barrier 260, the barrier 260 may shift to the back crushing the supports 262a and/or 262b.

Crushing the supports 262a and/or 262b may press one or more of the shock sensors 310a-310e. Pressing the shock sensors 310a-310e may cause the hydraulic fluid to flow through the line 312 and open the valve 330. Opening the valve 330 may enable the compressed air to flow from the compressor 350 to the piston 200 and start lifting the front of the compartment 104 (as shown in association with FIG. 14). The left rear pillar 120L of the compartment 104 may start to rotate in the left rear pillar 110L of the chassis 102. The arc groove 130L may move on the wheels 150a-150c. The sliders 140L may slide on the wheels 160a-160b (e.g., the compartment 104 may be lifted from the front by the cylinder 200). Similarly, the right side of the compartment 104 may move with respect to the chassis 102.

The base 114 of chassis 102 may collapse as a result of the impact. Collapsing the base 114 of the chassis 102 may cause the distance between the front pillars 112L/112R and the rear pillars 110L/110R of the chassis 102 to decrease. The front pillars 112L/112R of the chassis 102 may move toward the rear of the vehicle 50. Since the base of piston 200 is attached to the front of chassis 102, the piston 200 may move towards the back as well. Moving the piston 200 towards the back may change the angle 210 between the compartment base 126 and the chassis base 114. Increasing the angle 210 may increase the amount of lift of the front of the compartment 104 even more (as shown in association with FIG. 16). The compartment 104 may keep moving forward and inclining upwards, while the base 114 of the chassis 102 may absorb energy and decelerate the force. The compartment 104 may start slowing down over time until the compartment 104 stops completely in a gentle way. The passengers 54a-54b may be leaned back on the seats 56a-56b. After the crash, pressing on the button 370 may open the valve 334 to bring the compartment 104 down to the default position.

The functions performed by the diagrams of FIG. 1-22 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a chassis comprising a chassis base, curved rear chassis pillars and inclined front chassis pillars;
a compartment comprising a compartment base and curved rear compartment pillars; and
a safety system configured to (a) receive a signal and (b) activate a safety measure in response to said signal, wherein (i) said chassis supports said compartment, (ii) said compartment provides seating for occupants of a vehicle, (iii) said signal indicates an amount of force, (iv) said safety measure comprises (a) lifting a front of said compartment from said chassis, (b) rotating said curved rear compartment pillars along said curved rear chassis pillars and (c) absorbing said force with said chassis base while said compartment is lifted.

2. The apparatus according to claim 1, wherein said safety measure is configured to contribute efficiently to the safety of said occupants in a case of at least one of a frontal and a rear collision.

3. The apparatus according to claim 1, wherein said compartment further comprises a roof, an inclined front compartment pillar and a straight middle compartment pillar.

4. The apparatus according to claim 1, wherein lifting said front of said compartment from said chassis enables the chassis to absorb energy.

5. The apparatus according to claim 1, wherein lifting said front of said compartment from said chassis is configured to (i) keep said occupants of said vehicle on said seating and (ii) prevent said occupants from going forward and hitting inside portions of said vehicle.

6. The apparatus according to claim 1, wherein (i) said curved rear compartment pillars each comprise an arc groove and a slider and (ii) said curved rear chassis pillars each comprise a first set of wheels and a second set of wheels.

7. The apparatus according to claim 6, wherein said arc groove moves said curved rear compartment pillars on said first set of wheels and said slider slides said curved rear compartment pillars on said second set of wheels to enable said rotating of said curved rear compartment pillars along said curved rear chassis pillars.

8. The apparatus according to claim 7, wherein said first set of wheels and said second set of wheels are configured to create a gap between said curved rear compartment pillars and said curved rear chassis pillars to facilitate said rotating of said curved rear compartment pillars along said curved rear pillars.

9. The apparatus according to claim 6, wherein an internal surface of said curved rear chassis pillars fits along an external surface of said curved rear compartment pillars.

10. The apparatus according to claim 1, wherein said vehicle is at least one of a car, a minivan, a utility van, a truck, and a cabin portion of a truck.

11. The apparatus according to claim 1, further comprising a piston configured to lift said front of said compartment from said chassis, wherein said piston is extended in response to compressed air.

12. The apparatus according to claim 11, wherein (i) said piston is attached to a front of said chassis and said compartment base and (ii) as said front of said chassis is pushed back in response to a collision said piston increases an angle between said chassis base and said compartment base.

13. The apparatus according to claim 11, wherein (i) said safety system is configured to open a valve in response to said signal and (ii) said valve enables said compressed air to flow from an air compressor to extend said piston.

14. The apparatus according to claim 1, wherein said safety system is implemented by at least one of an electronic activation system and a hydraulic activation system.

15. The apparatus according to claim 14, wherein said hydraulic activation system implements a back-up system for said electronic activation system.

16. The apparatus according to claim 14, wherein said electronic activation system comprises a control unit, a distance sensor, a speed sensor and a deceleration sensor.

17. The apparatus according to claim 16, wherein said control unit is configured to (i) receive a distance measurement from said distance sensor and a speed measurement from said speed sensor to determine whether to lift said compartment from said chassis a first amount before a collision, (ii) receive a deceleration measurement from said deceleration sensor to determine said amount of force if said collision occurs, (iii) activate said safety measure to lift said compartment from said chassis a second amount if said amount of force is above a threshold and (iv) lower said compartment if said amount of force is below said threshold.

18. The apparatus according to claim 14, wherein said hydraulic activation system comprises shock sensors mounted on said vehicle and a hydraulic fluid line.

19. The apparatus according to claim 18, wherein (i) said shock sensors are configured to detect said amount of force and release a hydraulic fluid through said hydraulic fluid line to open a valve and (ii) said valve is configured to enable a flow of compressed air to lift said compartment from said chassis.

* * * * *